(12) United States Patent
Frank

(10) Patent No.: US 7,125,077 B2
(45) Date of Patent: Oct. 24, 2006

(54) SEAT BOLSTER ADJUSTMENT APPARATUS AND METHOD

(75) Inventor: Richard Frank, Eichingen (DE)

(73) Assignee: L&P Property Management Company, South Gate, CA (US)

(*) Notice: Subject to any disclaimer, the term of this patent is extended or adjusted under 35 U.S.C. 154(b) by 0 days.

(21) Appl. No.: 10/280,446

(22) Filed: Oct. 25, 2002

(65) Prior Publication Data

US 2004/0080198 A1 Apr. 29, 2004

(51) Int. Cl.
A47C 3/025 (2006.01)

(52) U.S. Cl. .............................. 297/284.9; 297/284.1; 297/411.3; 297/284.3

(58) Field of Classification Search ............. 297/284.3, 297/284.7, 452.21, 488, 410, 408, 487, 411.3, 297/411.36, 284.9, 452.34, 452.35, 452.36, 297/452.25, 452.23, 411.37, 115
See application file for complete search history.

(56) References Cited

U.S. PATENT DOCUMENTS

| 4,244,623 | A | * | 1/1981 | Hall et al. | 297/411.36 |
| 4,522,445 | A | * | 6/1985 | Goldner et al. | 297/284.9 |
| 4,969,684 | A | * | 11/1990 | Zarotti | 297/180.12 |
| 5,120,109 | A | * | 6/1992 | Rangoni | 297/284.3 |
| 5,662,382 | A | * | 9/1997 | Kerr et al. | 297/238 |
| 5,669,666 | A | * | 9/1997 | Lee | 297/408 |
| 5,795,026 | A | * | 8/1998 | Dral et al. | 297/411.36 |
| 5,803,544 | A | * | 9/1998 | Block et al. | 297/284.3 |
| 5,829,839 | A | * | 11/1998 | Wilkerson et al. | 297/411.36 |
| 5,839,784 | A | * | 11/1998 | Breen | 297/383 |
| 5,857,743 | A | | 1/1999 | Ligon, Sr. et al. | 297/284.9 |
| 5,975,637 | A | * | 11/1999 | Geuss et al. | 297/391 |
| 6,460,932 | B1 | * | 10/2002 | Kopish et al. | 297/411.36 |
| 6,511,130 | B1 | * | 1/2003 | Dinkel et al. | 297/410 |
| 6,616,229 | B1 | * | 9/2003 | Kuster et al. | 297/284.9 |
| 6,802,563 | B1 | * | 10/2004 | Mysliwiec et al. | 297/284.9 |
| 6,843,534 | B1 | * | 1/2005 | Lee et al. | 297/411.35 |

FOREIGN PATENT DOCUMENTS

DE 197 56 700 C1 12/1998
DE 199 15 003 A1 10/2000

OTHER PUBLICATIONS

Copy of English translation of pp. 2-4 of German office action dated Mar. 22, 2005.
International Search Report for PCT/US02/04722 Mailed Aug. 14, 2002 (See Cited Documents Referenced Above).

* cited by examiner

Primary Examiner—Peter M. Cuomo
Assistant Examiner—Erika Garrett
(74) Attorney, Agent, or Firm—Husch & Eppenberger, LLC; Grant D. Kang

(57) ABSTRACT

An active bolster adjustment apparatus for use in vehicle seats includes a mounting plate connected with the vehicle seat. An adjustable bolster slider is in sliding communication with the mounting plate, and has an adjustment arm and a pressure surface. A drive unit having an actuator and a gear set and the gear set is in direct communication with the adjustable bolster slider.

32 Claims, 5 Drawing Sheets

SEAT BOLSTER ADJUSTMENT APPARATUS AND METHOD

CROSS-REFERENCE TO RELATED APPLICATIONS

None.

STATEMENT REGARDING FEDERALLY SPONSORED RESEARCH

None.

TECHNICAL FIELD OF THE INVENTION

This invention relates generally to an apparatus for reducing muscle fatigue and discomfort of a seated occupant and, more particularly, to adjustable bolsters for seats, especially automobile seats.

DESCRIPTION OF THE RELATED ART

Vehicle seats commonly utilize bolsters on the sides of the seat back to assist the occupant in remaining centered within the seat. Bolsters are typically positioned vertically to engage the torso of the occupant near the bottom of the occupant's rib cage. Bolsters help maintain the occupant in a fixed position during vehicle maneuvers that might otherwise displace the occupant in a lateral direction.

Because occupants vary greatly in size, variable position bolsters have been developed. These variable bolsters allow the occupant to adjust the area between a seat's bolsters to better suit the occupant's build while maintaining the desired level of lateral movement control of the occupant. U.S. Pat. No. 5,857,743 illustrates one example of a variable bolster system.

Existing bolster systems generally utilize Bowden type traction cable assemblies as part of a means for adjusting the bolster positions. Bowden cables are coaxial mechanical devices wherein a wire slides axially through a sleeve or conduit. While Bowden cable systems can be an efficient means for applying traction to moving parts in ergonomic devices, they require relative large amounts of space. The Bowden cable mechanisms utilized in these existing systems result in slower response time of the bolster adjustment mechanism to a control signal, making these existing systems unsuitable for dynamically adjustable bolster systems. Furthermore, Bowden cable assemblies are not modular and usually must be replaced as an entire unit. In addition, existing bolster systems require distinct right and left bolster assemblies that are not interchangeable. These factors increase the costs of manufacture, storage and assembly associated with existing bolster adjustment mechanisms.

The present invention is directed to overcoming one or more of the problems set forth above.

SUMMARY OF THE INVENTION

An aspect of the present invention is to provide an adjustable bolster system having a more compact and modular package design and a faster adjustment response.

Another aspect of the present invention is to provide a dynamically adjustable bolster system with a largely self-contained design and a variable mounting capability.

Another aspect of the present invention is to provide an adjustable bolster system capable of independent adjustment of each individual bolster.

Yet another aspect of the present invention is to provide a bolster system that is compatible with a dynamic bolster adjustment system, which is capable of adapting to variable lateral forces exerted on a vehicle occupant during changing travel conditions.

In accordance with the above aspects of the invention, there is provided an active bolster adjustment apparatus for use in seats that includes a mounting plate connected with the seat frame, an adjustable bolster slider in sliding communication with the mounting plate, and a drive unit in communication with the adjustable bolster slider, the drive unit having an actuator and a gear set. Although the invention would be appropriately used in a vehicle seat, such use should not be deemed limiting in any manner, and the invention may be used for any type of seat in which an adjustable bolster system is desired.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
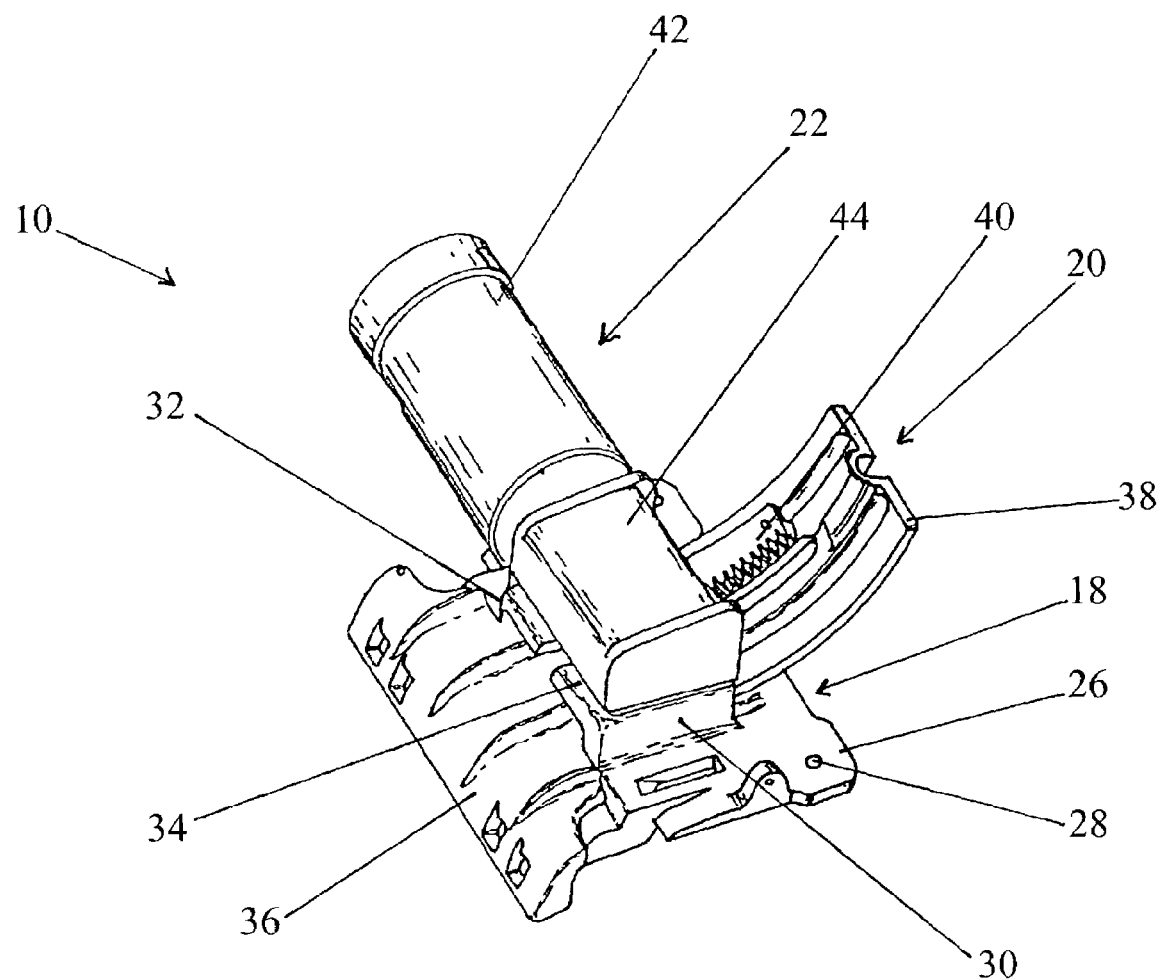
FIG. 1 is a perspective view of an active bolster mechanism according to an embodiment of the present invention.
Figure 2:
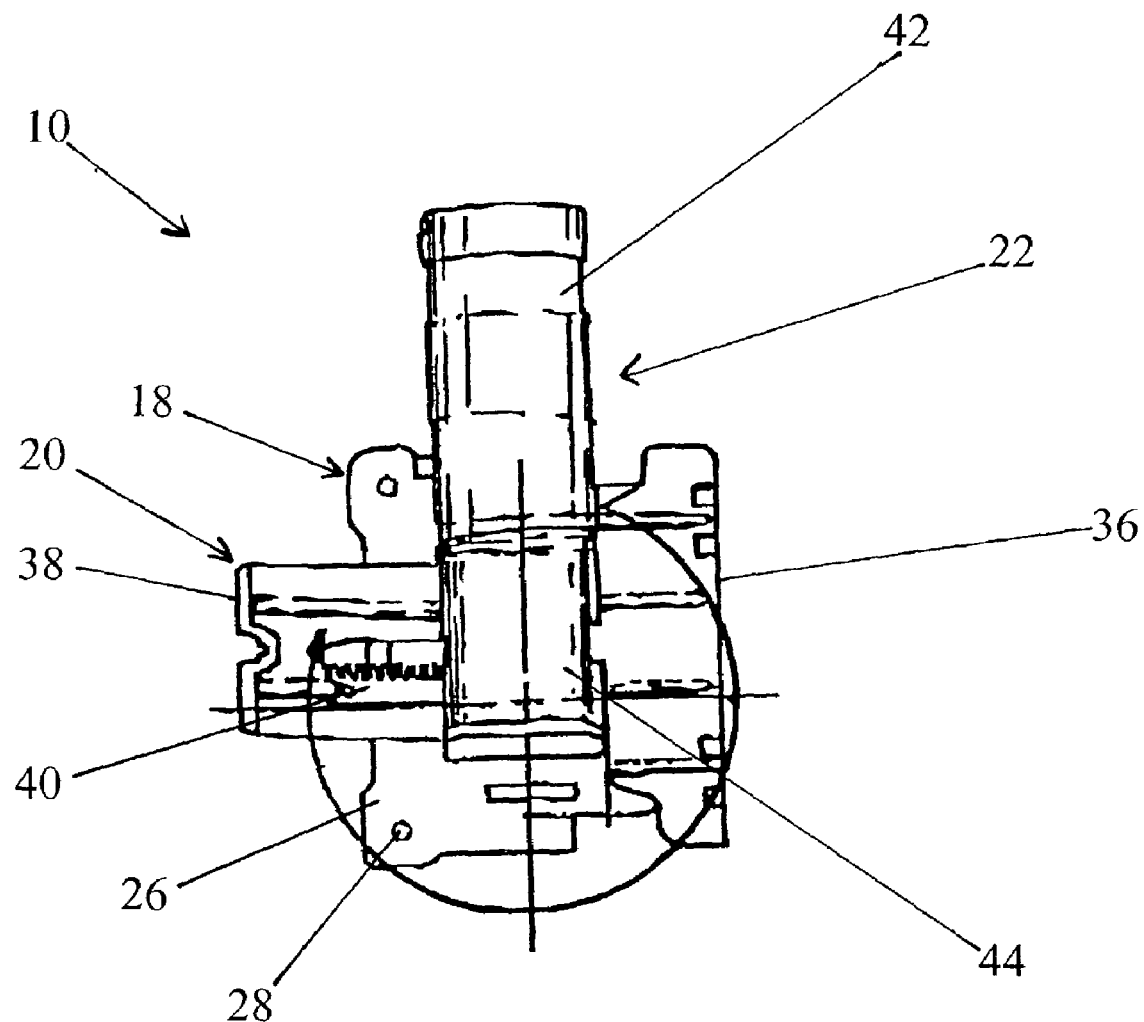
FIG. 2 is a side view of an active bolster mechanism according to an embodiment of the present invention having an actuator positioned in a first orientation.
Figure 3:
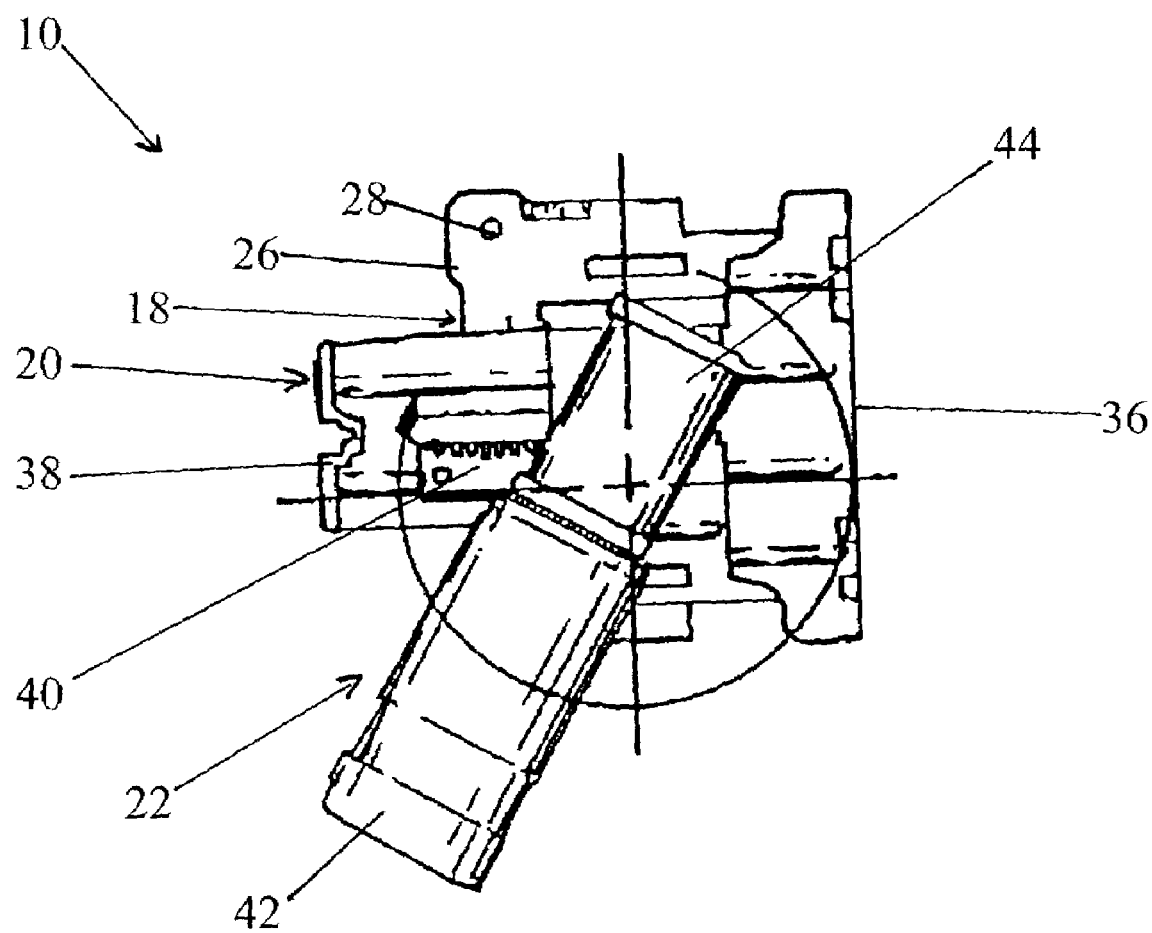
FIG. 3 is a side view of the active bolster mechanism of FIG. 2 showing the actuator in a second orientation.
Figure 4:
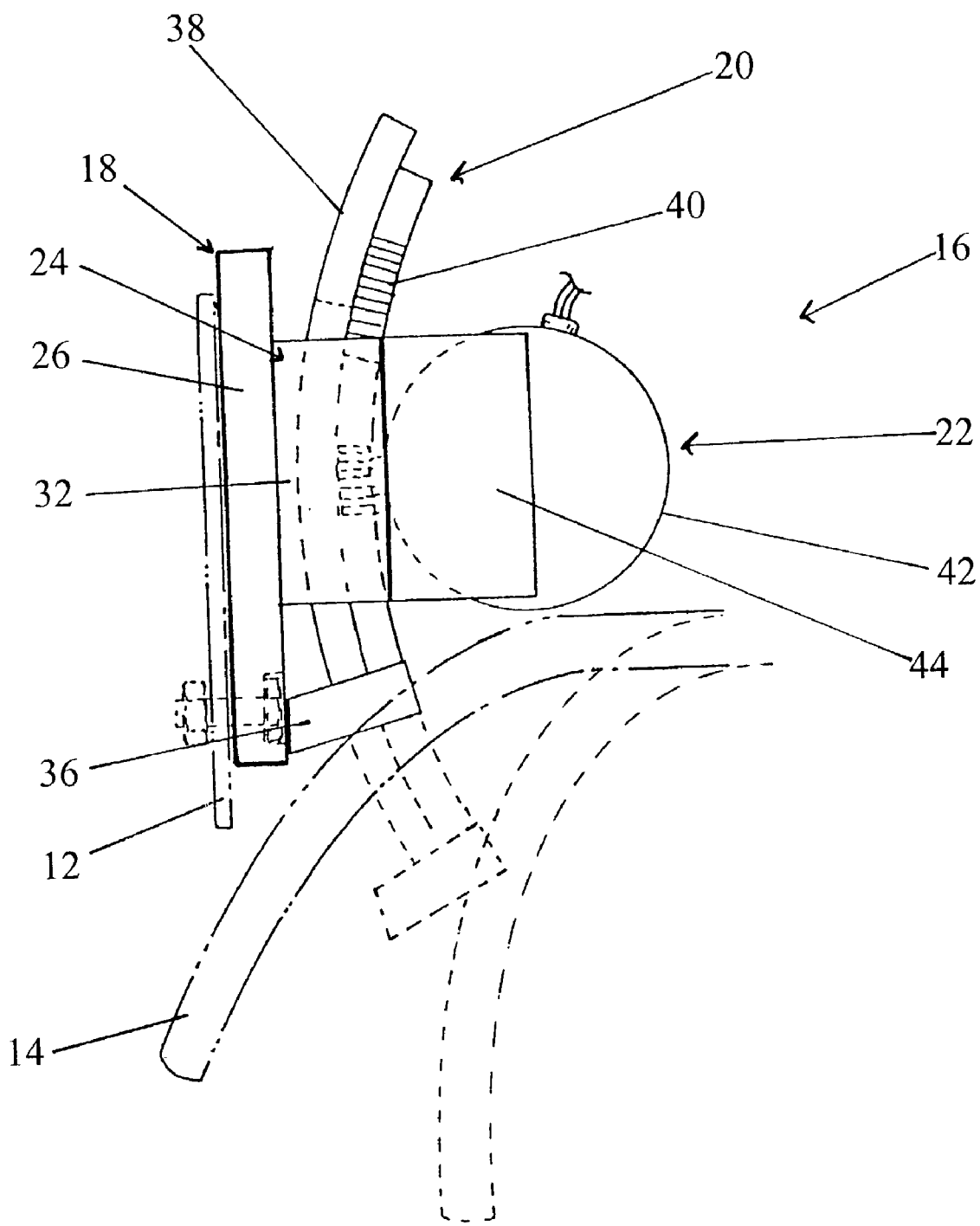
FIG. 4 is a schematic view of an active bolster system according to an embodiment of the present invention illustrating a portion of its range of motion as viewed from above.

An active bolster system for a vehicle seat is illustrated in FIGS. 1–4. The active bolster system 10 is associated with a seat bolster. A seat bolster may have a separate unit 14 as depicted in FIG. 4 or an integral pressure surface 36 on an adjustable bolster slider 20 as depicted in FIGS. 1–3. A bolster adjusting mechanism 16 varies the position of the seat bolster 14, thereby changing the lateral support provided to an occupant of the seat. The bolster adjusting mechanism 16 includes a mounting plate 18, an adjustable bolster slider 20, and a drive unit 22. In this embodiment, the seat bolster 14 is interposed between the seat occupant and the bolster adjustment mechanism 16. In an alternate embodiment, the bolster adjustment mechanism 16, and, in particular, the pressure surface 36 (described below), acts directly on the occupant with no interposing bolster cushion. The active bolster system described herein is suitable for operation in either of these embodiments.

The mounting plate 18 is fixed to a seat frame 12. The mounting plate 18 is provided with a guide section 24 and a frame mounting section 26. In the embodiments shown in FIGS. 1–4, the frame mounting section 26 is provided with plural mounting holes 28 through which bolts, rivets, screws or other similar devices are inserted in order to secure the mounting plate 18 to the seat frame 12. Other mounting means, for example welding or adhesive, may also be utilized to secure the mounting plate. The guide section 24 serves the dual purpose of guiding the movement of the adjustable bolster slider 20, as will be explained in detail below, and providing a mounting surface for the drive unit 22. The guide section 24 is formed by a pair of parallel walls 30, 32 that rise perpendicularly from the frame mounting section 26 and a top surface 34 which extends between the walls 30, 32 parallel to the frame mounting section 26. In the embodiment shown, the top surface 34 is provided with an access hole (not shown) that allows the drive unit 22 to communicate with the adjustable bolster slider 20. The access hole may be of any suitable shape and size to accommodate the gearing associated with the drive unit 22.

The adjustable bolster slider 20 includes a pressure surface 36 and an adjustment arm 38 wherein the pressure surface 36 is situated at a distal end of the adjustment arm 38 as shown in FIGS. 1–4. The seat bolster 14 is connected to the pressure surface 36. The adjustment arm 38 is provided with a narrower, more elongated configuration than the pressure surface and is designed to interact with the guide section 24 of the mounting plate 18. During assembly of the adjustment mechanism, the adjustment arm 38, with width w, is inserted into the space defined by the walls 30, 32, the frame mounting section 26 and the top surface 34 of the mounting plate 18. During operation of the mechanism, this space partly defines the path that the adjustment arm 38, of the slider 20, travels through. The adjustment arm 38 includes a strip of gear teeth 40, which engage gear teeth (not shown) in the drive unit 22. In the depicted embodiment, the adjustment arm 38 has an angular or arcuate shape.

The drive unit 22 includes an actuator 42 and a gear set 44. In the embodiment shown the actuator 42 is an electric motor. In a preferred arrangement, the actuator 42 is directly connected to the gear set 44. The gear set 44 in the drive unit 22 meshes with the strip of gear teeth 40 on the adjustment arm 38. The gear set includes a series of gears (not shown) arranged to transfer the motive force of the actuator 42 to the adjustment arm 38.

Gear sets of this type are well-known in the art, and, therefore, the following embodiments are not shown in detail in the accompanying drawings. In one embodiment, the actuator 42 includes an output shaft extending from the actuator towards the gear set 44. A first bevel gear is affixed to the end of the output shaft and is turned with the output shaft by the actuator. A second bevel gear is oriented at a ninety degree angle to and engages with the first bevel gear. The second bevel gear is rotatably mounted on a post that is secured to the housing of the gear set 44. The second bevel gear extends downward from the gear set 44 to engage the gear teeth 40 of the adjustment arm 38. The second bevel gear may be comprised of two separate but connected gears, one engaging with the first bevel gear and the second engaging the gear teeth 40 of the adjustment arm. In alternate embodiments, gear sets utilizing three or more gears are provided to transfer the rotation of the actuator 42 to the adjustment arm 38. The gear ratios of these alternate gear sets may be varied to control the movement of the adjustment arm 38. Alternate gearing arrangements are well-known in the art and may be substituted for the described embodiments.

The drive unit 22 is also provided with a mounting surface (not shown) to allow the drive unit 22 to be fixed to the top surface 34 of the guide section 24. The mounting surface of the drive unit 22 and the top surface 34 of the mounting plate 18 are provided with a means for pivotably mounting the drive unit 22 to the top surface of the mounting plate 18. The means for pivotably mounting the drive unit 22 allow the actuator to be rotated relative to the mounting plate 18, thereby providing a variety of mounting positions for the bolster adjustment mechanism relative to the seat frame and increasing the flexibility of the active bolster system. In one embodiment, the means for pivotally mounting the drive unit 22 is formed by a plurality of mounting holes (not shown) located in the top surface 34 of the mounting plate 18. In another embodiment, the means for pivotally mounting the drive unit 22 includes a mounting pin (not shown) that is rotatably connected with the drive unit 22 and the top surface 34 of the mounting plate 18. The mounting pin is preferably connected with a generally central point of the gear set 44 of the drive unit and a generally central point of the top surface 34 of the mounting plate 18. Other suitable pivoting mounting arrangements are well-known in the art and, therefore, are not described in detail here.

Figure 5:
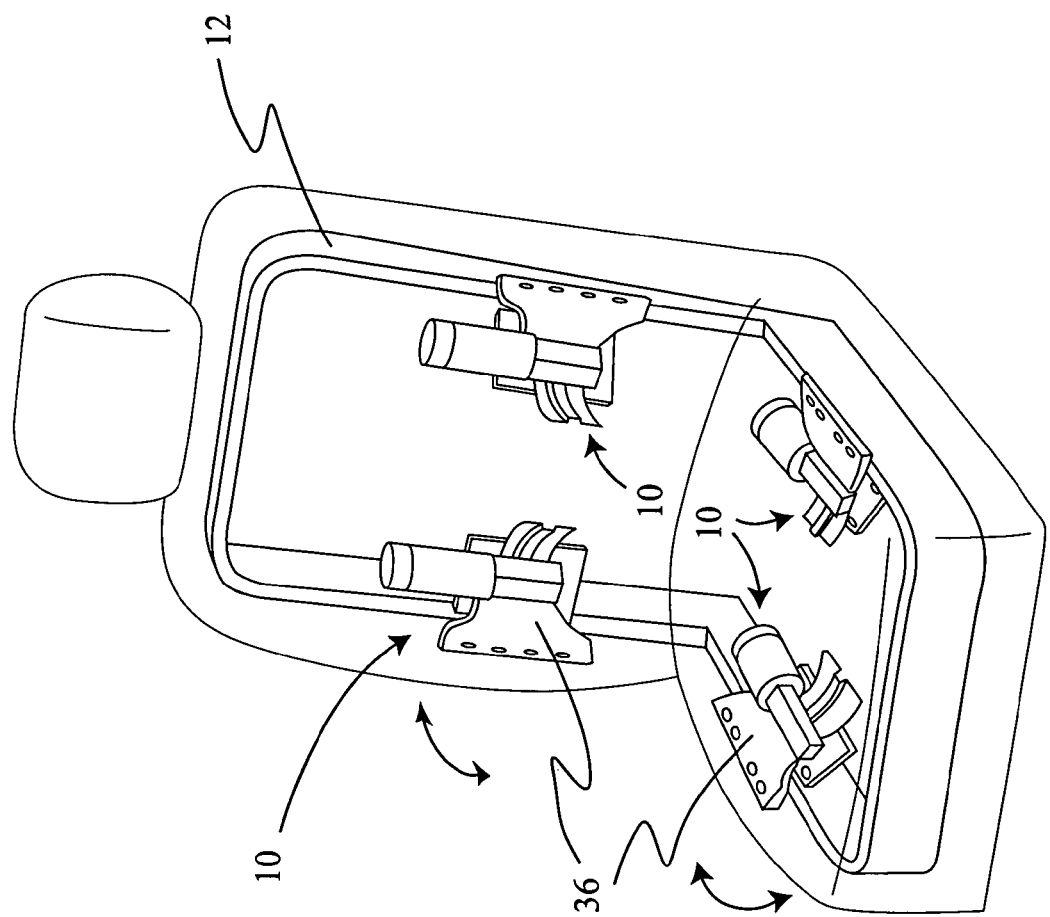
FIG. 5 is an isometric view of a seat frame showing active bolster systems attached to the frame at various lateral positions.

The direct drive system described above eliminates the use of Bowden cables to control the seat bolsters and results in a more compact bolster adjustment package. In addition, this arrangement provides a modular design that enables the left and right bolster adjustment mechanisms to be removed and replaced independently of one another. Furthermore, the adjustable mounting feature of the drive unit allows a single design to serve both the right and left sides of the seat. Active bolster system 10 is designed for mounting to lateral portions of seat frame 12 (FIG. 5), to provide lateral support to a seat occupant. Curved, double-headed arrows suggest the direction of arcuate movement of pressure surface 36, as depicted in FIG. 4.

As the actuator 42 rotates, it drives the gear set 44. The gear set 44, in turn, drives the strip of gear teeth 40, and with it the slider 20, in a lateral direction. The amount and direction of rotation of the actuator 42 and gear set 44 determines the amount and direction of travel of the slider 20. In the preferred embodiment with an angular-shaped adjustment arm 38, the resulting motion of the pressure surface 36 is an arc.

The active bolster system is particularly well-suited for operation with a dynamic bolster adjustment system. In such a system, the active bolster system operates in conjunction with a control unit and multiple vehicle performance sensors. The control unit may be a microcomputer, a programmable controller, or any other suitable programmable unit known in the art. The control unit communicates with and controls the drive units of the left and right bolster assemblies independently. In a one embodiment, the vehicle performance sensors include an acceleration sensor, a velocity sensor, and a steering angle sensor. Each of these sensors continuously communicates a signal that reflects the current acceleration, velocity or steering angle to the control unit during vehicle operation. From these signals, the control unit calculates the approximate current lateral forces being exerted on the vehicle occupants. Based on the amount and direction of the current lateral forces being exerted, the control unit determines the proper positioning for each of the left and right bolsters. The control unit then signals the amount and direction of rotation of each actuator required to achieve those positions. The control unit then transmits separate signals to the drive units of the left and right bolster assemblies directing the actuator of the each drive unit to rotate the desired amount in the proper direction. This results in the left and right seat bolsters being properly positioned to provide optimal lateral support for the seat occupant based on the current lateral forces being exerted on the occupant.

Other objects, features and advantages of the present invention will be apparent to those skilled in the art. While preferred embodiments of the present invention have been illustrated and described, this has been by way of illustration and the invention should not be limited.

What is claimed is:

1. An active lateral bolster adjustment apparatus for a vehicle seat, including:
   a mounting plate, said mounting plate having a seat frame mounting section and a guide section;
   an adjustable lateral bolster slider in sliding communications with said mounting plate, said slider having an integral lateral bolster pressure surface, an integral adjustment arm, and an integral gear tooth strip associated with the adjustment arm; and
   a drive unit comprising an actuator and a gear set in communication with the mounting plate, wherein the gear set communicates directly with the integral gear tooth strip.

2. An active lateral bolster adjustment apparatus as set forth in claim 1, wherein the actuator is an electric motor.

3. An active lateral bolster adjustment apparatus as set forth in claim 1, wherein the integral adjustment arm and integral gear tooth strip are provided with an arcuate shape such that the lateral bolster pressure surface applies pressure at significantly different angles with respect to the mounting plate as the adjustable lateral bolster slider is slideably engaged by the gear set.

4. An active lateral bolster adjustment apparatus as set forth in claim 1, wherein the integral adjustment arm and integral gear tooth strip slides into the guide section and the guide section guides the slidable movement of the adjustable lateral bolster slider.

5. An active lateral bolster adjustment apparatus as set forth in claim 1 wherein the guide section includes a top surface and the drive unit is mounted directly to the top surface of the guide section.

6. An active lateral bolster adjustment apparatus as set forth in claim 5, wherein the top surface of the guide section includes a plurality of mounting holes positioned such that the drive unit is mountable to the guide section in a plurality of orientations.

7. An active lateral bolster adjustment apparatus as set forth in claim 5, wherein the gear set is positioned directly above the integral gear tooth strip.

8. An active lateral bolster adjustment apparatus as set forth in claim 5, wherein the drive unit is pivotably mounted to the top surface of the guide section.

9. An active lateral bolster adjustment apparatus as set forth in claim 1, wherein outer dimensions of the gear set are substantially within a perimeter of the mounting plate.

10. An active lateral bolster adjustment apparatus as set forth in claim 1, wherein outer dimensions of the adjustable lateral bolster slider are substantially within a parameter of the mounting plate in at least one dimension.

11. An active lateral bolster adjustment apparatus for a vehicle seat, including:
    a mounting plate, said mounting plate having a seat frame mounting section and a guide section;
    an adjustable lateral bolster slider in sliding communication with the mounting plate, said lateral bolster slider having an integral pressure surface, an integral adjustment arm, and an integral gear tooth strip associated with the adjustment arm, and wherein the integral adjustment arm and integral gear tooth strip are provided with an arcuate shape;
    a drive unit in communication with the adjustable lateral bolster slider, said drive unit including an actuator and a gear set, wherein the actuator communicates directly with the gear set and the gear set communicates directly with the integral gear tooth strip; and
    wherein the drive unit is pivotally mounted to the mounting plate.

12. A method for actively adjusting the position of a lateral bolster on a vehicle seat, including the steps of:
    providing a vehicle seat comprising a seat frame, a seat lateral bolster in a first position, a drive unit comprising an actuator and a gear set, said drive unit being pivotally mounted to a mounting plate, said mounting plate having a seat frame mounting section and a guide section, and said mounting plate being affixed to said seat frame by said mounting section, and further providing an adjustable lateral bolster slider in sliding communication with said guide section and said lateral bolster slider being in communication with said seat lateral bolster;
    creating a rotational motive force by means of the actuator;
    transferring said rotational motive force from the actuator to the gear set and from the gear set into slidable movement of said adjustable lateral bolster slider;
    guiding the slidable movement of the adjustable lateral bolster slider through the guide section on said mounting plate; and
    moving said seat lateral bolster to a second position by means of said adjustable lateral bolster slider.

13. A modular lateral bolster adjustment apparatus for a vehicle seat, including:
    a mounting plate with a seat frame mounting section and a guide section;
    an adjustable lateral bolster slider having a gear tooth strip associated therewith that interacts with the guide section;
    a gear set mounted to the guide section and communicating with the adjustable lateral bolster slider;
    an actuator directly engaged with the gear set; and
    the mounting plate, adjustable lateral bolster slider, gear set and actuator forming a self-contained, integrated lateral bolster adjustment module for unitary mounting to a seat frame.

14. A modular lateral bolster adjustment apparatus for a vehicle seat as set forth in claim 13, wherein the vehicle seat includes left and right lateral bolsters each of which lateral bolsters is independently adjustable by the self-contained, integrated lateral bolster adjustment module which is suitable for use with either the left or right lateral bolsters.

15. A modular lateral bolster adjustment apparatus for a vehicle seat as set forth in claim 13, wherein first and second self-contained, integrated lateral bolster adjustment modules are provided for the left and right lateral bolsters, respectively, and wherein the first and second self-contained, integrated lateral bolster adjustment modules operate and can be installed and removed independently of one another.

16. A method of assembling a modular lateral bolster adjustment apparatus for a vehicle seat having a seat frame, including the steps of:
   providing a lateral bolster slider having an integral pressure surface, an integral adjustment arm, and an integral gear tooth strip associated with the adjustment arm;
   inserting the adjustment arm of the lateral bolster slider into a guide section of a mounting plate;
   mounting a gear set to the guide section; and
   engaging the gear set with the integral gear tooth strip of the lateral bolster slider.

17. A method of assembling a modular lateral bolster adjustment apparatus as set forth in claim 16, further including the step of engaging the gear set with an actuator.

18. A lateral bolster slider for a vehicle seat lateral bolster adjustment apparatus, including:
   a pressure surface for applying pressure by the lateral bolster slider;
   an adjustment arm; and
   a gear tooth strip, wherein each of said pressure surface, said adjustment arm and said gear tooth strip are integrally formed of a single piece of material to form the lateral bolster slider.

19. A lateral bolster slider for a vehicle seat lateral bolster adjustment apparatus as set forth in claim 18, wherein the integral adjustment arm and integral gear tooth strip are arcuate such that the lateral bolster pressure surface applies pressure at significantly different angles with respect to a mounting plate for the apparatus as the adjustable lateral bolster slider is driven by a gear set.

20. An active bolster adjustment apparatus for a vehicle seat, comprising:
   a mounting plate, said mounting plate having a guide section and a seat frame mounting section;
   an adjustable bolster slider in sliding communication with said mounting plate, said adjustable bolster slider having an elongated integral adjustment arm, an integral bolster pressure surface situated at a distal end of said integral adjustment arm substantially normal thereto, and an integral gear tooth strip associated with said integral adjustment arm, said integral gear tooth strip being substantially parallel to said elongated integral adjustment arm; and
   a drive unit comprising an actuator and a gear set in communication with the mounting plate, wherein the gear set communicates directly with the integral gear tooth strip.

21. The active bolster adjustment apparatus of claim 20 wherein said adjustable bolster slider is arcuate.

22. The active bolster adjustment apparatus of claim 20 wherein said active bolster adjustment apparatus is a lateral active bolster adjustment apparatus.

23. The active bolster adjustment apparatus of claim 20 wherein, as a result of said sliding communication, said bolster slider moves along a path of travel and wherein said integral bolster pressure surface is configured to apply pressure to a seat occupant in a direction approximately equivalent to said path of travel of said bolster slider.

24. The active bolster system of claim 23 wherein said adjustment arm and said path of travel are arcuate.

25. An active bolster adjustment apparatus for a vehicle seat, comprising:
   (a) a mounting plate, said mounting plate having a guide section and a seat frame mounting section;
   (b) an adjustable bolster slider in sliding communication with said mounting plate, said slider comprising:
      (1) an elongated integral adjustment arm having an internal channel running parallel thereto;
      (2) an integral bolster pressure surface; and
      (3) an integral gear tooth strip associated with said adjustment arm, wherein said gear tooth strip is disposed within said internal channel on said adjustment arm; and
   (c) a drive unit comprising an actuator and a gear set in communication with the mounting plate, wherein the gear set communicates directly with the integral gear tooth strip.

26. The active bolster adjustment apparatus of claim 25 wherein said gear tooth strip is disposed along one side of said internal channel.

27. A lateral bolster slider comprising:
   an elongated adjustment arm having an internal channel running parallel thereto;
   an integral bolster pressure surface; and
   an integral gear tooth strip associated with said adjustment arm, wherein said gear tooth strip is disposed within said internal channel on said adjustment arm.

28. The lateral bolster slider of claim 27 wherein said gear tooth strip is disposed along one side of said internal channel.

29. The lateral bolster slider of claim 27 wherein said elongated adjustment arm is arcuate.

30. A lateral bolster slider comprising:
   an elongated adjustment arm having a gear tooth surface parallel thereto;
   an integral bolster pressure surface; and
   a gear tooth strip associated with said adjustment arm, wherein said gear tooth strip is disposed on said gear tooth surface of said adjustment arm, said gear tooth strip comprising a plurality of teeth, wherein each of said teeth is oriented approximately normal to said gear tooth surface of said adjustment arm.

31. The lateral bolster slider of claim 30 wherein said adjustment arm is arcuate, such that said gear tooth surface is concave.

32. The lateral bolster slider of claim 30 wherein said integral pressure surface is disposed at an end of said elongated adjustment arm and is substantially normal thereto.

* * * * *